No. 814,972. PATENTED MAR. 13, 1906.
F. B. LONG.
PIANO ACTION.
APPLICATION FILED OCT. 12, 1904. RENEWED JAN. 30, 1906.
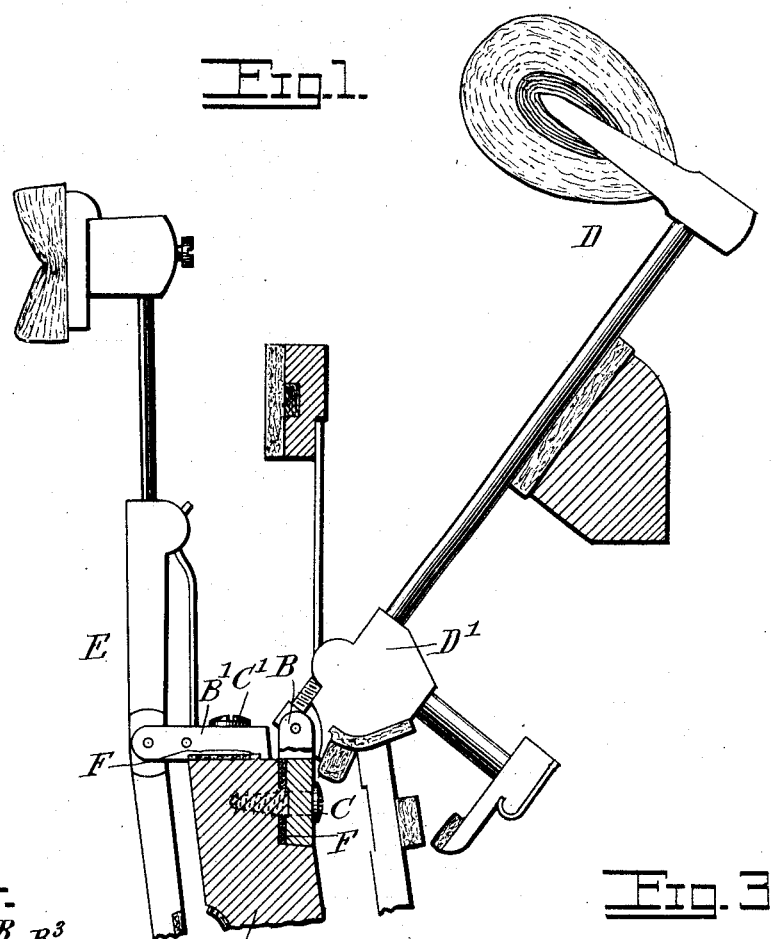
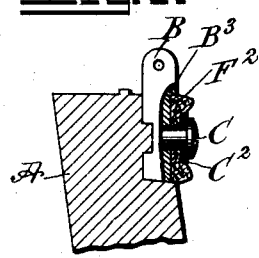
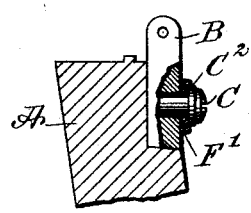
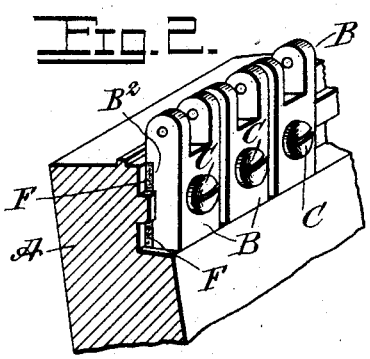
WITNESSES:
L. Almquist
Geo. J. Hosted
INVENTOR
Frank B. Long
BY
ATTORNEYS

UNITED STATES PATENT OFFICE.

FRANK B. LONG, OF LOS ANGELES, CALIFORNIA.

PIANO-ACTION.

No. 814,972.　　　　　Specification of Letters Patent.　　　　　Patented March 13, 1906.

Application filed October 12, 1904. Renewed January 30, 1906. Serial No. 298,612.

*To all whom it may concern:*

Be it known that I, FRANK B. LONG, a citizen of the United States, and a resident of Los Angeles, in the county of Los Angeles and State of California, have invented new and useful Improvements in Piano-Actions, of which the following is a full, clear, and exact description.

The object of the invention is to provide such new and useful improvements in piano-actions whereby the flanges for the hammers, dampers, or other parts of the action are not liable to become loose and rattle on playing the instrument or by reason of the climatic changes.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of an upright-piano action provided with the improvement. Fig. 2 is a perspective view of the improvement as applied to the hammer-rail and the flanges for the hammers. Fig. 3 is a cross-section of a modified form of the improvement as applied to the flanges for the hammers, and Fig. 4 is a like view of another modified form of the improvement.

On the hammer or center rail A of the piano-action are fastened sets of flanges B and B' by means of flanged screws C and C', and on the free ends of the flanges B are fulcrumed the hammer-butts D' of the hammers D, while on the free ends of the flanges B' are fulcrumed the dampers E of the piano-action to allow the said hammers D and the dampers to swing on the corresponding flanges.

As illustrated in Figs. 1 and 2, layers F of a compressible material, such as cork, are interposed between the contacting faces of the flanges B and B' and the rail A, the said layers F being preferably fitted into recesses $B^2$, formed on the inner faces of the flanges, and the said layers are compressed to a considerable extent on screwing up the flanged screws C or C'.

In the modified form illustrated in Fig. 3 the layer F' for a flange is interposed between the outer face of the flange and the washer $C^2$ under the head of the corresponding flanged screw C or C', and in the modified form illustrated in Fig. 4 the layer $F^2$ is fitted into a recess $B^3$, formed on the outer face of the flange B or B', and the middle portion of this layer $F^2$ is engaged at its outer face by the washer $C^2$, so that when the corresponding flanged screw C or C' is screwed up the middle portion of this layer $F^2$ is compressed, and consequently by the resilient action of the compressed layer the several parts fastened together are not liable to jar loose on playing the instrument or by reason of climatic changes.

The device described is very simple and durable in construction and can be readily applied to other parts of a piano-action or to other devices besides the hammer and damper action shown.

In Figs. 1 and 2 it will be observed that the rail A is provided with a raised longitudinal rib, which enters the recesses $B^2$ of said flanges and which receives the shanks of the screws C, so that when the parts are properly organized the outer face of said rib will lie snugly against the bases of said recesses, the layers of cork completely filling the recesses on opposite sides of the rib. By this construction the layers of cork are not entered by the screws, so that the cork is not punctured nor the resiliency of the material impaired in any other way, while the parts fit together snugly, as shown.

Having thus described my invention, I claim as new and desire to secure by Letters Patent—

1. The combination with a rail having on a face thereof a raised longitudinal rib, of a flange having a recess receiving the rib against the base thereof, a fastening-screw for the flange entering the rib, and a compressible resilient material filling the recess on either side of the rib.

2. The combination with a rail having on a face thereof a raised longitudinal rib, of a plurality of flanges having corresponding recesses receiving the rib against the bases thereof, fastening-screws for the flanges, each entering the rib, and a compressible resilient material filling the recesses on either side of the rib.

3. The combination with a rail of a piano-action provided with a raised longitudinal rib, of a flange having a recess on its inner face receiving the rib, a flanged fastening-screw for the flange entering the said rib, and a layer of cork filling the recess of the flange on opposite sides of the said rib, and adapted to be compressed between the flange and the rail on screwing up the fastening-screw.

In testimony whereof I have signed my name to this specification in the presence of two subscribing witnesses.

FRANK B. LONG.

Witnesses:
   THEO. G. HOSTER,
   EVERARD BOLTON MARSHALL.